US006817865B2

(12) United States Patent
Charbonneau

(10) Patent No.: US 6,817,865 B2
(45) Date of Patent: Nov. 16, 2004

(54) TRAINING DEVICE FOR BREAST EXAMINATION

(75) Inventor: Joan Charbonneau, Basking Ridge, NJ (US)

(73) Assignee: Promotions Unlimited, Inc., Basking Ridge, NJ (US)

(*) Notice: Subject to any disclaimer, the term of this patent is extended or adjusted under 35 U.S.C. 154(b) by 0 days.

(21) Appl. No.: 10/386,206

(22) Filed: Mar. 11, 2003

(65) Prior Publication Data

US 2004/0180314 A1 Sep. 16, 2004

(51) Int. Cl.⁷ ............................................. G09B 23/28
(52) U.S. Cl. ....................... 434/273; 434/262; 434/267
(58) Field of Search ............................... 434/262, 267, 434/272, 273

(56) References Cited

U.S. PATENT DOCUMENTS

| 4,001,951 | A | * | 1/1977 | Fasse | 434/267 |
|---|---|---|---|---|---|
| 4,134,218 | A | | 1/1979 | Adams et al. | 35/17 |
| 4,655,716 | A | * | 4/1987 | Hoevel | 434/267 |
| 4,737,109 | A | | 4/1988 | Abramson | 434/267 |
| 4,867,686 | A | * | 9/1989 | Goldstein | 434/267 |
| 5,207,582 | A | * | 5/1993 | Michelson | 434/416 |
| RE34,353 | E | * | 8/1993 | Perry et al. | 600/300 |
| 5,273,435 | A | * | 12/1993 | Jacobson | 434/267 |
| 5,479,661 | A | * | 1/1996 | Fingleson et al. | 2/69 |
| 5,494,442 | A | * | 2/1996 | Hecht | 434/267 |
| 5,913,686 | A | * | 6/1999 | VanWinkle | 434/267 |
| 6,507,663 | B2 | | 1/2003 | Souluer | 382/128 |

* cited by examiner

Primary Examiner—Kurt Fernstrom
(74) Attorney, Agent, or Firm—Husch & Eppenberger, LLC; Grant D. Kang

(57) ABSTRACT

A training device for breast examination comprises a resilient body composed of a fleshlike material. A plurality of nodules are embedded within the resilient body. A base is attached to a bottom surface of the resilient body. The base is provided with breast self-examination instructions.

9 Claims, 3 Drawing Sheets

TRAINING DEVICE FOR BREAST EXAMINATION

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to a training device for breast examination and, more particularly, to a training device and instruction card for breast self-examination.

During 2002, it was estimated that over 203,000 new cases of breast cancer were expected among American women. Women are encouraged to recognize the importance of early breast cancer detection and are asked by their healthcare providers to perform monthly breast self-examinations. Women, however, are often perplexed about how to perform a self-examination and, more importantly, how to recognize a diseased breast. Because of this, it is desirous to find a training device for breast examination.

2. Related Art

U.S. Pat. No. 4,001,951, issued to Fasse, is related to the present invention in that Fasse attempts to help facilitate the detection of human breast cancer. Fasse discloses a device having an elastically yielding body having a plurality of lumps at locations where cancer is typically found in a human breast. Fasse, however fails to adequately instruct a person on how to perform a breast self-examination. Fasse does not provide detailed instructions on breast self-examination. Instead, Fasse, teaches that a physician may guide a patient's hand over the device in order to teach with what strength the examining pressure should be applied.

U.S. Pat. No. 4,737,109, issued to Abramson, discloses a device for training persons to distinguish among the various forms of lesions found in the human breast. Abramson discloses the aspect of using the device as a home kit, along with proper instruction, for women to become familiar with manual breast examination. Abramson, however, does not disclose the aspect of having device instructions actually on the device itself.

SUMMARY OF THE INVENTION

It is in view of the above problems that the present invention was developed. Generally, a training device for breast examination comprises a resilient body composed of a flesh like material.

A plurality of nodules are embedded within the resilient body. A base is attached to the underside of the resilient body wherein the base also contains breast self-examination instructions. The method of the present invention comprises the steps of providing a resilient body composed of a fleshlike material having a plurality of nodules embedded within the resilient body. Second, a base is provided and attached to the underside of the resilient body in such fashion that the base contains breast self-examination instructions. Finally, women are instructed on the proper way to perform a breast self-examination. Women review the base containing the breast self-examination instructions and then physically examines the resilient body by probing the fleshlike material. The goal with the examination is to familiarize women with breast abnormalities associated with breast cancer.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
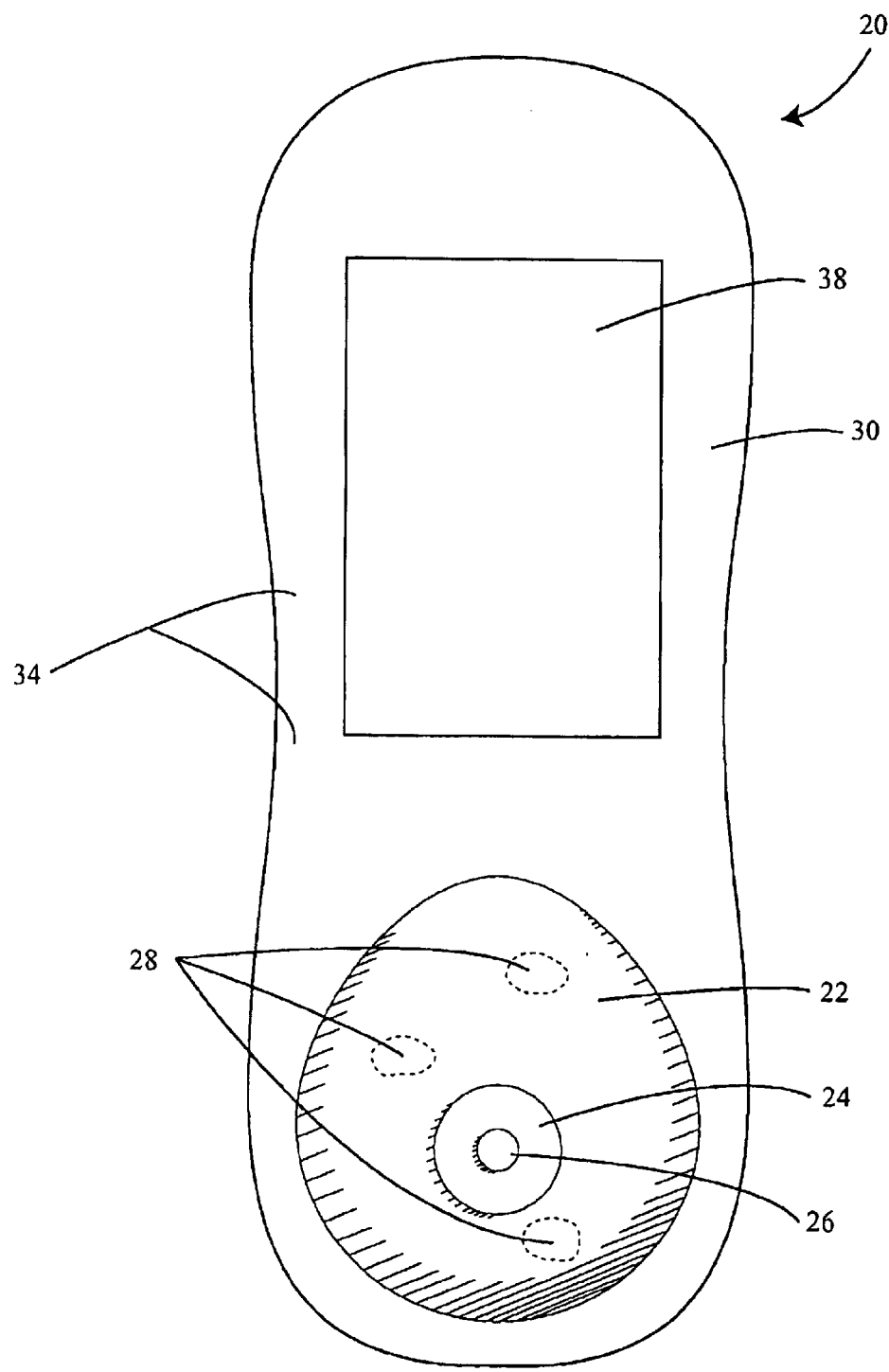
FIG. 1 illustrates a front view of a typical training device for breast examination.

Referring to the accompanying drawings in which like reference numbers indicate like elements, FIG. 1 illustrates a training device for breast examination. Reference character 20 generally indicates an apparatus of the present invention. A human breast is modeled in the apparatus 20 as a resilient body 22 composed of a fleshlike material. The resilient body 22 is a semi-oval shape and is contoured in much the same way as a human breast. It is, however, envisioned that the resilient body 22 may be any shape suitable for demonstrating the proper methods of breast self-examination. The resilient body 22 resembles a human breast in size, shape, composition, density, and texture.

The resilient body 22 has an areola 24 that is contoured into the resilient body and a nipple 26 that is, likewise, contoured into the areola. The fleshlike material of the resilient body 22 is composed of foam rubber. It is, however, foreseeable that the fleshlike material may be fabricated with any suitable material providing the tactile feel of a real human breast, such as silicone. Likewise, it is also possible that the fleshlike material of the resilient body 22 may be fabricated in such manner as to not contain the areola 24 or nipple 26, as breast cancer is most often found in the fleshy tissue of the breast and not in the areola or nipple.

A plurality of nodules 28 are embedded or encapsulated within the resilient body 22. The plurality of nodules 28, (different) greater in density than the surrounding resilient body 22, are sized and shaped to resemble human breast abnormalities associated with breast cancer. Similarly, as with lumps associated with breast cancer, the plurality of nodules 28 vary in size, shape, and texture. It is envisioned that the plurality of nodules 28 may be plastic, metal, or any material having a firmness and density greater than the surrounding resilient body 22. In the preferred embodiment, nodules 28 are made from cotton balls encapsulated by polypropylene.

Figure 2:
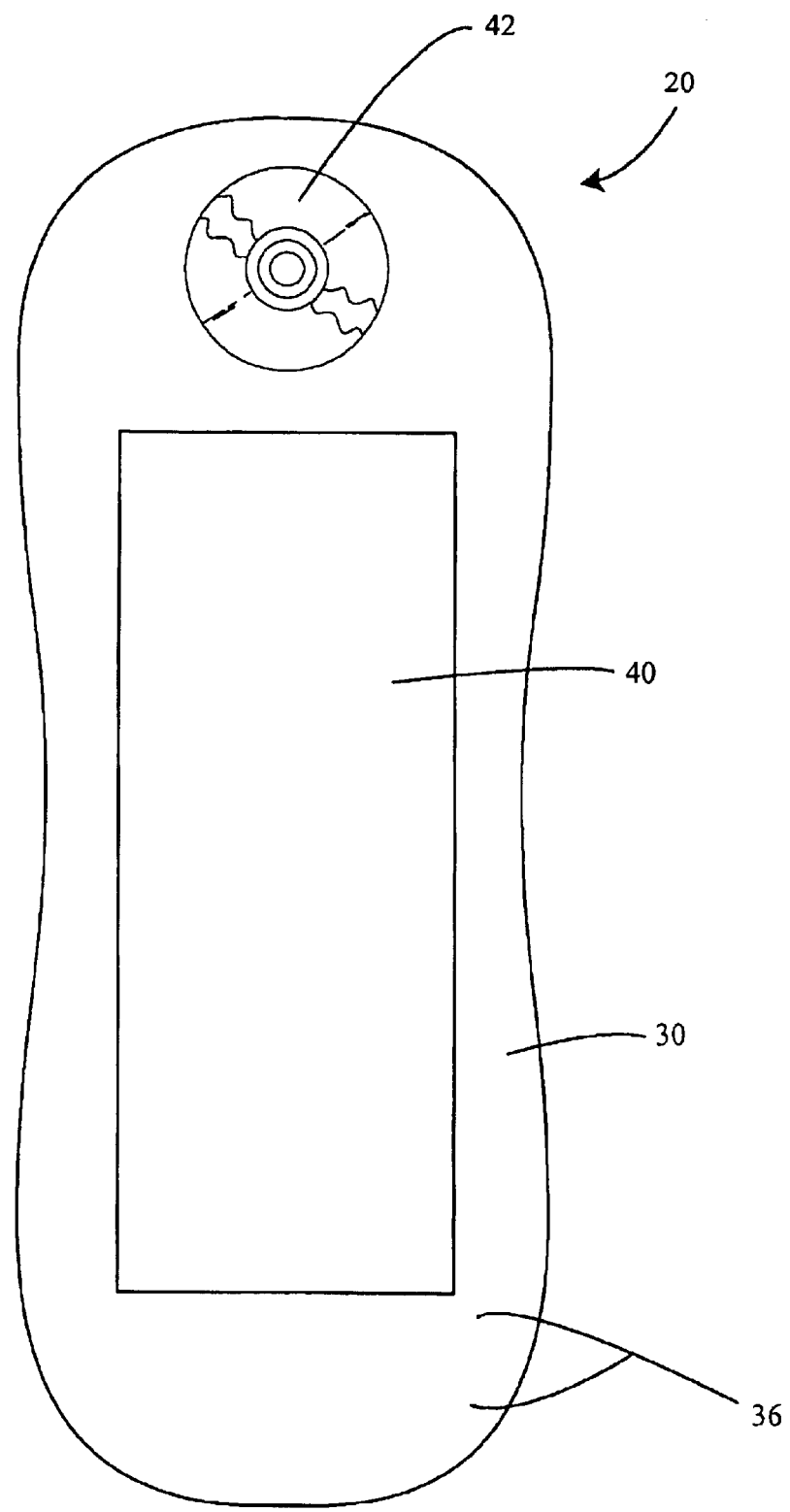
FIG. 2 illustrates a back view of the training device for breast examination, shown with a two-sided releasable suction attachment mechanism.
Figure 3:
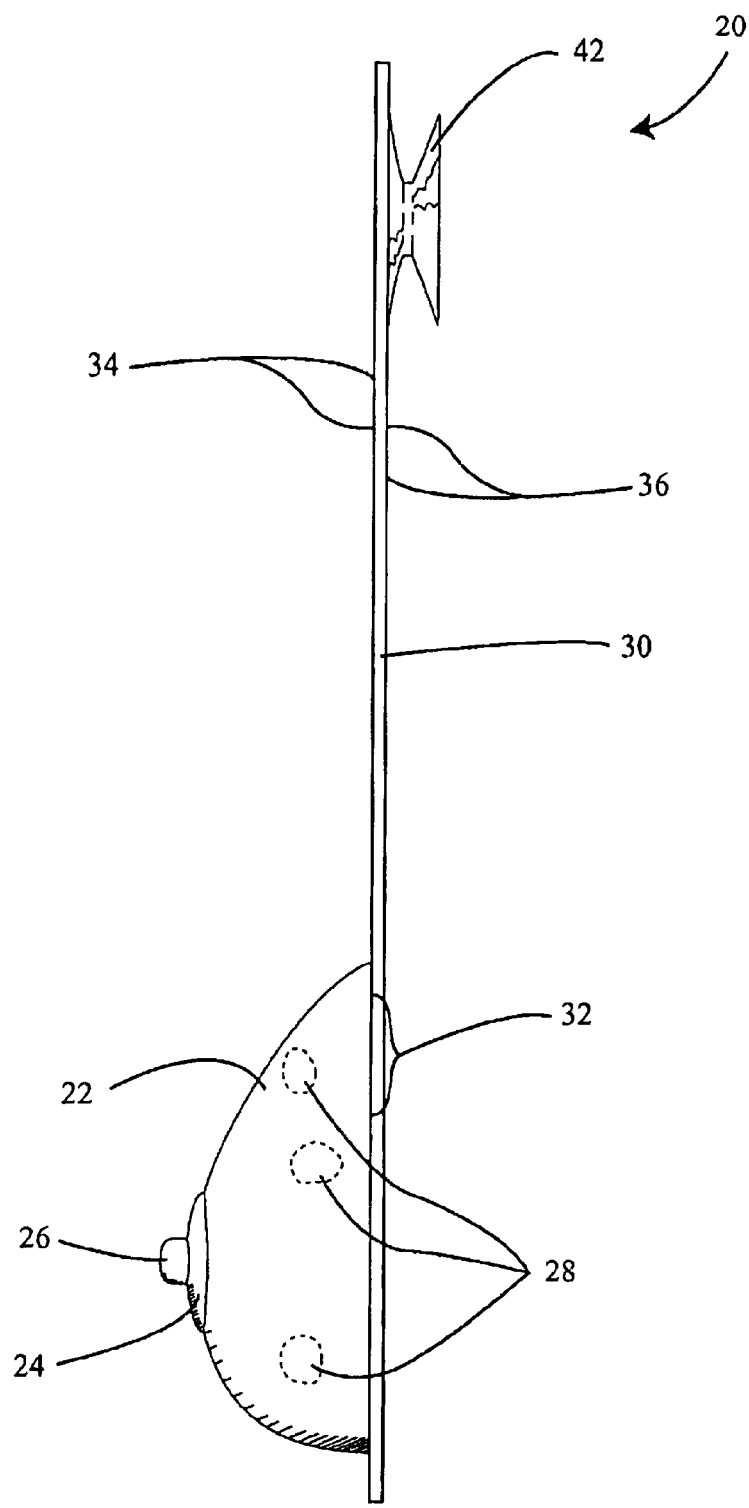
FIG. 3 illustrates a profile view of the training device for breast examination, shown with the two-sided releasable suction attachment mechanism.

Referring simultaneously to FIGS. 2 and 3, a base 30, attached to a bottom surface 32 of the resilient body 22, contains breast self-examination instructions. The base 30 is constructed of a hard flexible plastic, preferably 1.2 mm polystyrene, allowing easy attachment with the resilient body 22 by an adhesive, glue (preferably non-lead glue), bolts, or other suitable attachment means. The base 30 is a two-sided card that has a front side 34 and a back side 36. The base 30, which is sized to provide an area for breast self-examination has a front instruction area 38 on the front side 34 of the base and a back instruction area 40 on the back side 36 of the base. The base 30 is fabricated to provide enough room for the resilient body 22 and front instruction area 38. Both the front instruction area 38 and back instruction area 40 contain detailed breast self-examination instructions facilitating easy instruction in properly using the apparatus 20.

In the preferred embodiment, the detailed breast self-examination instructions contain words and diagrams showing proper breast self-examination techniques. The words and diagrams are part of the base 30 and are not removable. It is envisioned, however, that the breast self-examination instructions may also be included in a removable format, such as a detachable card, without deviating from the scope of the apparatus 20.

The training device for breast examination 20 has a mounting component 42 allowing the apparatus to be mounted and oriented to suit a user's preference. It is envisioned that women may use the apparatus 20 when showering. The mounting component 42, a two-sided releasable suction attachment mechanism, therefore, may be attached to the back side 36 of the base 30 and a wall in order to facilitate shower installation. It is, however, also possible that women may install the apparatus 20 in their bedrooms or any other suitable area for breast self-examination. Likewise, some women may decide to use the apparatus 20 without the mounting component 42 as such action does not compromise the apparatus' usefulness.

Training women to perform a breast self-examination with the apparatus 20 involves providing the resilient body 22 that is composed of fleshlike material. The resilient body 22 has a plurality of nodules 28 embedded within the resilient body 22. A base 30, containing breast self-examination instructions, is provided to attach to the underside of the resilient body 22. Woman are then instructed on the proper way to perform a breast self-examination. Women review the base containing breast self-examination instructions and then physically examine the resilient body 22 by probing the fleshlike material with their fingers. The manual probing is conducted in order to familiarize themselves with breast abnormalities associated with breast cancer. The breast abnormalities in the apparatus 20 are the plurality of nodules 28 embedded within the resilient body 22. Performing a breast self-examination in this way will help women recognize their own potentially diseased breasts and facilitate early medical intervention.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not scribed exemplary embodiments, but should be defined only in aims appended hereto and their equivalents.

What is claimed is:

1. A training device for breast examination comprising:
    a resilient body having a bottom surface;
    a plurality of nodules embedded within said resilient body;
    a base attached to said bottom surface of said resilient body, with said base sized to provide an area for containing breast self-examination instructions; and
    a mounting component removably attached to said base and a wall in order to facilitate installation.

2. A training device for breast examination according to claim 1 wherein said resilient body resembles a human breast in size, shape, and density.

3. A training device for breast examination according to claim 1 wherein said resilient body is composed of a fleshlike material.

4. A training device for breast examination according to claim 3 wherein said fleshlike material is composed of foam rubber.

5. A training device for breast examination according to claim 1 whereby said plurality of nodules are of different density than said resilient body.

6. A training device for breast examination according to claim 5 whereby said plurality of nodules resemble human breast abnormalities associated with breast cancer in size, shape and density.

7. A training device for breast examination according to claim 1 wherein said base further comprises:
    a card having a front side and a back side, wherein said card has breast self-examination instructions printed on said front and said back side of said card.

8. A training device for breast examination according to claim 1 wherein said mounting component is a two-sided releasable suction cup.

9. A method of training women to perform a breast self-examination comprising:
    providing a resilient body having an underside, wherein said resilient body is composed of a fleshlike material;
    embedding a plurality of nodules within said resilient body;
    attaching a base to said underside of said resilient body
    printing breast self-examination instructions on said base;
    removably attaching a mounting component to said base for attaching said base to a wall; and
    instructing women on the proper way to perform a breast self-examination by having women review said base containing breast self-examination instructions and then physically examine said resilient body by probing said fleshlike material, in order to familiarize themselves with breast abnormalities associated with breast cancer.

* * * * *